(12) United States Patent
Goli et al.

(10) Patent No.: US 12,490,412 B2
(45) Date of Patent: Dec. 2, 2025

(54) THREE-DIMENSIONALLY PATTERNABLE THERMAL INTERFACE

(71) Applicant: Henkel AG & Co. KGaA, Duesseldorf (DE)

(72) Inventors: Pradyumna Goli, Prior Lake, MN (US); Reid J. Chesterfield, Eden Prairie, MN (US); Matthew Bren, Waconia, MN (US); Kevin Olson, St. Paul, MN (US)

(73) Assignee: Henkel AG & Co. KGaA, Duesseldorf (DE)

( * ) Notice: Subject to any disclaimer, the term of this patent is extended or adjusted under 35 U.S.C. 154(b) by 860 days.

(21) Appl. No.: 17/728,495

(22) Filed: Apr. 25, 2022

(65) Prior Publication Data

US 2022/0369516 A1 Nov. 17, 2022

Related U.S. Application Data

(63) Continuation of application No. PCT/US2020/057279, filed on Oct. 26, 2020.
(Continued)

(51) Int. Cl.
| | |
|---|---|
| *H05K 7/20* | (2006.01) |
| *B29C 64/112* | (2017.01) |
| *B29C 64/209* | (2017.01) |
| *B29C 64/336* | (2017.01) |
| *B29K 83/00* | (2006.01) |

(Continued)

(52) U.S. Cl.
CPC ........ *H05K 7/20481* (2013.01); *B29C 64/112* (2017.08); *B29C 64/209* (2017.08); *B29C 64/336* (2017.08); *B33Y 10/00* (2014.12); *B33Y 70/00* (2014.12); *B33Y 80/00* (2014.12); *B29K 2083/00* (2013.01); *B29K 2105/0094* (2013.01);
(Continued)

(58) Field of Classification Search
CPC . H05K 7/20481; B29C 64/112; B29C 64/209; B29C 64/336; B33Y 10/00; B33Y 70/00; B33Y 80/00; B29K 2083/00; B29K 2105/0094; B29K 2105/24; B29K 2995/0013; B29K 2995/0094;
(Continued)

(56) References Cited

U.S. PATENT DOCUMENTS

| | | | |
|---|---|---|---|
| 6,706,219 B2 | 3/2004 | Nguyen | |
| 10,068,830 B2 * | 9/2018 | Zeng | ............... H01L 23/3737 |

(Continued)

FOREIGN PATENT DOCUMENTS

| | | |
|---|---|---|
| CN | 101088697 A | 12/2007 |
| CN | 101835830 A | 9/2010 |

(Continued)

OTHER PUBLICATIONS

Adhere technical bulletin TB2007-12 (Year: 2018).*
International Search Report in connection with International Application No. PCT/US2020/057279 mailed Feb. 5, 2021.

*Primary Examiner* — Andrew J. Oyer
(74) *Attorney, Agent, or Firm* — Steven C. Bauman (57) ABSTRACT

A three-dimensional geometry of a thermal interface body may be customized to substantially fill an irregular gap along a thermal dissipation pathway in an electronic package. The thermal interface body is fabricated through an additive deposition process, wherein sequential patterns of thermal interface material are coherently connected to other deposited patterns of thermal interface material.

31 Claims, 9 Drawing Sheets

Related U.S. Application Data (60) Provisional application No. 62/926,109, filed on Oct. 25, 2019.

(51) Int. Cl.
*B29K 105/00* (2006.01)
*B29K 105/24* (2006.01)
*B29L 31/34* (2006.01)
*B33Y 10/00* (2015.01)
*B33Y 70/00* (2020.01)
*B33Y 80/00* (2015.01)

(52) U.S. Cl.
CPC .. *B29K 2105/24* (2013.01); *B29K 2995/0013* (2013.01); *B29K 2995/0094* (2013.01); *B29L 2031/34* (2013.01)

(58) Field of Classification Search
CPC ..... B29L 2031/34; C08G 77/12; C08G 77/20; C08L 83/04; C08L 2205/025
See application file for complete search history.

(56) References Cited

U.S. PATENT DOCUMENTS

| | | |
|---|---|---|
| 11,192,354 B2 | 12/2021 | Backer et al. |
| 2007/0187641 A1 | 8/2007 | Cheng et al. |
| 2010/0233926 A1 | 9/2010 | Shin et al. |
| 2011/0038124 A1 | 2/2011 | Burnham et al. |
| 2014/0374071 A1 | 12/2014 | Timmerman et al. |
| 2020/0238601 A1* | 7/2020 | Pachaly ................ B29C 64/112 |

FOREIGN PATENT DOCUMENTS

| | | |
|---|---|---|
| CN | 101910341 A | 12/2010 |
| CN | 102066488 A | 5/2011 |
| CN | 108136662 A | 6/2018 |
| EP | 3389086 | 10/2018 |
| JP | 2013107029 A | 6/2013 |
| JP | 2017516290 A | 6/2017 |
| WO | 2019063094 A1 | 4/2019 |

* cited by examiner

THREE-DIMENSIONALLY PATTERNABLE THERMAL INTERFACE

FIELD

The present invention relates to thermal interfaces generally, and more particularly to customizable thermal interface bodies for substantially filling a gap between an electronic component and a heat dissipater. The thermal interface body is formed through additive deposition to achieve customizable geometries.

BACKGROUND

Thermally transmissive materials are widely employed as interfaces between, for example, a heat-generating electronic component and a heat dissipater for permitting transfer of excess thermal energy from the electronic component to a thermally coupled heat dissipater. Numerous designs and materials for such thermal interfaces have been implemented, with the highest performance being achieved when gaps between the thermal interface and the respective heat transfer surfaces are substantially avoided. The thermal interface material is therefore preferably conformable to the somewhat uneven heat transfer surfaces of the respective components.

Example conformable thermal interface materials include silicone polymers forming a matrix that is filled with thermally conductive particles such as aluminum oxide and boron nitride. The materials are typically sufficiently flexible to conform to irregularities of the interface surfaces, whether at room temperature or elevated temperatures. Silicone greases or waxes tend to not be form-stable, particularly at elevated operating temperatures, and are therefore subject to bleed-out from an interfacial position over time. To counteract this challenge, some thermal interface materials are packaged as a film, sheet, tape, or pad that require specialized installation techniques and tools. Often, such thermal interface material formats exhibit relatively high bulk modulus values that inhibit comprehensive conformability.

Some thermal interface materials are dispensed in a low-viscosity condition and subsequently cured into a high-viscosity state. These form-in-place materials can overcome some of the challenges of other thermal interface material formats, but nevertheless have their own limitations. For example, as proven difficult to achieve relatively thin bond lines, such as less than 100 micrometers, in conventional thermal interface materials. The bond line in an assembly refers to the gap between thermal surfaces into which the thermal interface is desirably installed to mitigate thermal barriers between the surfaces. Three-dimensional pre-cured thermal interface structures such as tapes, pads, and films typically lack sufficient robustness and handleability at thicknesses of less than 100 micrometers. Conventionally viscous gap fillers are limited by the high assembly force required for installation into a thin bond line. Traditional grease-like materials have long term reliability issues and do not exhibit an acceptable mechanical modulus and dielectric strength for use as dielectric coatings in thin bond line applications.

Another challenge presented with thin bond lines is the relatively significant impact that thermal surface contours present to the effectiveness of thermal interface materials. Surface irregularities and contours that might otherwise represent a small fraction of the total thermal pathway between the thermal surfaces in a large bond line system can instead have a dramatic impact on expected thermal performance in a thin bond line application. It would therefore be desirable to customize a thermal interface material to an irregular geometry that more closely mates with respective thermal surfaces along a thermal dissipation pathway. A form-in-place thermal interface material with a low dispensation viscosity enables the formulation to penetrate into the thin gap prior to cure. Customizing the three dimensional geometry of a thermal interface material with a form-in-place composition can optimize heat transfer performance.

SUMMARY

By means of the present invention, a patternable thermal interface body may be constructed to more closely match the gap geometry between thermal surfaces, such as between an electronic component and a heat dissipater. The patternable thermal interface body may be constructed with a variety of dispensation equipment programmed to apply flowable thermal interface material in an additive process.

A method for forming a thermal interface body includes applying a first curable resin precursor onto a surface in a first pattern of a plurality of discrete volumes, wherein the first curable resin precursor includes silicone and exhibits a first initial viscosity and a thermal conductivity of at least 0.2 W/m*K. The method further includes applying at least one of the first curable resin precursor and a second material in a second pattern of discrete volumes in contact with the first pattern. The second material may include a second curable resin precursor that exhibits a second initial viscosity that is different from the first initial viscosity and a thermal conductivity of at least 0.2 W/m*K.

To achieve the desired thermal conductivity, at least the first curable resin precursor may include thermally conductive particles at a first loading concentration. In some embodiments, the second curable resin precursor may also include thermally conductive particles and a second loading concentration. The first loading concentration of thermally conductive particles may be different than the second loading concentration. Each of the first and second curable resin precursors may include thermally conductive particles having a range of different particle diameters. The largest particle diameter may be at least 1.3 times greater than the smallest particle diameter.

The method for forming a thermal interface body may further include curing one or more of the first and second curable resin precursors to a cured viscosity that is different than a respective initial viscosity. The cured viscosities may be substantially greater than the respective initial viscosity. At least the first curable resin precursor may include a solvent, a reaction catalyst, and a reaction inhibitor effective to chemically interfere with the reaction catalyst, wherein the reaction inhibitor exhibits a lower vapor pressure than the solvent. In one example, the first and second curable resin precursors each include a vinyl containing silicone polymer and a hydride containing silicone polymer. The first curable resin precursor may include an excess of one of the vinyl containing silicone polymer and the hydride containing silicone polymer, and the second curable resin precursor includes an excess of the other of the vinyl containing silicone polymer and the hydride containing silicone polymer.

A method for forming a thermal interface body may include dispensing a first curable resin precursor in a first pattern of a plurality of discrete volumes onto a surface, and dispensing at least one of the first curable resin precursor and a second material in a second pattern of a plurality of discrete volumes onto at least one of the surface and the first pattern of discrete volumes. Subsequent to dispensing, the method includes curing the first curable resin precursor to adjust its viscosity. The thermal interface body may exhibit a thermal conductivity of at least 0.2 W/m*K.

A method for filling a gap between an electronic component and a heat dissipater includes providing a dispenser that is communicatively linked to a processor and defining a first width, a second width, and thickness dimensions of the gap as an input parameter. The input parameter is supplied to the processor so that, based on the input parameter, the dispenser additively applies a first layer of a first curable resin precursor onto a surface associated with at least one of the electronic component and the heat dissipater. The first layer preferably exhibits a thermal conductivity of at least 0.2 W/m*K. The dispenser then additively applies a second layer of the first curable resin precursor or a second composition into contact with the first layer. The first layer may include a first pattern of a plurality of discrete volumes of the first curable resin precursor, and the second layer may include a second pattern of a plurality of discrete volumes.

The method includes additively building a thermal interface body from at least the first and second patterns to have a first width, a second width, and thickness dimensions, wherein the thickness dimension may be non-uniform. In some embodiments, the thickness dimension may be less than 100 micrometers throughout the gap.

The second layer applied through the method may be different than the first layer by at least one of thermally conductive particle loading concentrations, cured viscosity, initial pre-cured viscosity, average thermally conductive particle size, distribution of thermally conductive particle size, curing rate, and thickness dimensions.

An electronic package of the present invention includes an electronic component, a heat dissipater, and a thermal interface body that is interposed between and in thermal contact with the electronic component and the heat dissipater. The thermal interface body is formed from a plurality of deposited layers, with each layer being deposited as an array of a plurality of discrete volumes of curable resin precursor and subsequently cured. The thermal interface body exhibits a thermal conductivity of at least 0.2 W/m*K. In some embodiments, a first composition of a first layer is different than a second composition of a second layer of the thermal interface body.

DETAILED DESCRIPTION OF THE PREFERRED EMBODIMENTS

The objects and advantages enumerated above together with other objects, features, and advances represented by the present invention will now be presented in tetras of detailed embodiments described with reference to the attached drawing figures. Other embodiments and aspects of the invention are recognized as being within the grasp of those having ordinary skill in the art.

Figure 1:
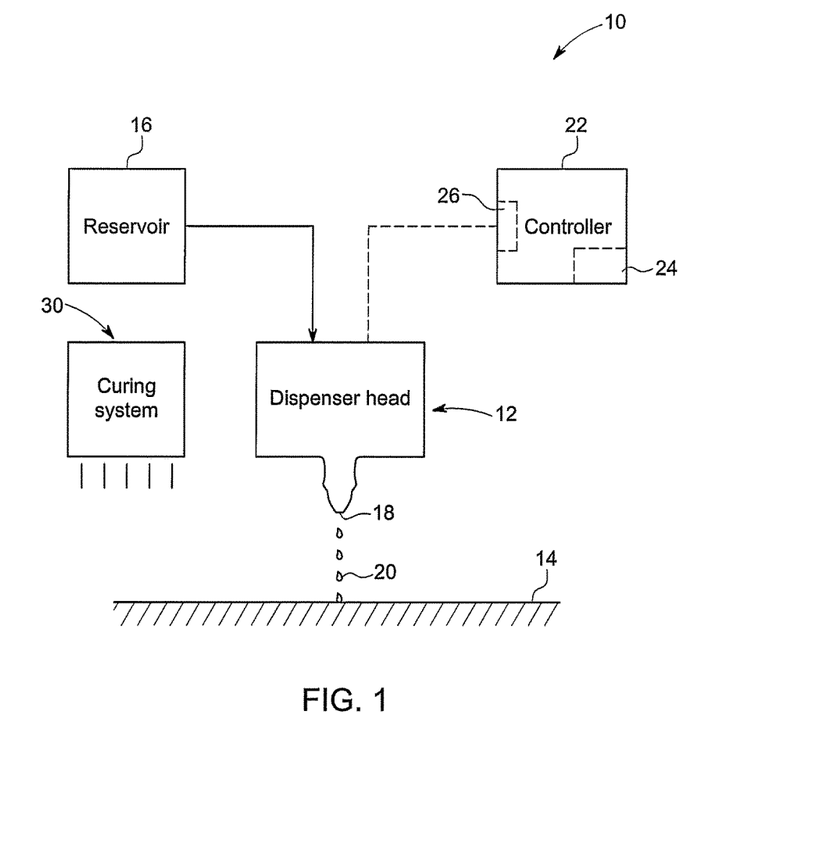
FIG. 1 is a schematic illustration of a system for forming a thermal interface body in accordance with the present invention.

A schematic illustration of an additive deposition system 10 is provided in FIG. 1 with a dispenser head 12 that is supplied with material for deposition onto a surface 14 from a reservoir 16. Material 20 is dispensed from an orifice 18 of dispenser head 12. A controller 22, which may include a processor 24 and a signal generator 26, may be programmed to control dispenser head 12 in dispensing one or more materials 20 in predetermined patters upon surface 14. Controller 22 may be programmed to create a three-dimensional thermal interface body through an additive deposition process in which one or more dispenser heads 12 may be controlled to each dispense one or more materials 20 in a coordinated manner to additively construct the three-dimensional thermal interface body. Therefore, it is to be understood that dispenser head 12 may represent one or more of an array of distinct dispenser heads forming a part of an additive deposition system 10 at which one or more of the dispenser heads 12 and surface 14 may be movable with respect to one another to effectuate the deposition of material 20 in predetermined patterns supported by surface 14.

Additive deposition system 10 may comprise one or more of a variety of deposition apparatus capable of additive deposition processes. Example useful dispensers include nozzle printers, drop dispensers, line dispensers, metered spray heads, Venturi printers, and the like.

Additive deposition system 10 may further include a curing means 30 for providing an input for curing a curable material 20. Example curing means include a heating means such as an oven or an infrared lamp, an ultraviolet radiation source such as an ultraviolet lamp, chemical curing agent source for application to material 20, and/or other known means for curing a curable material 20. For the purposes hereof, the term "curing" means the changing of properties of a resin by chemical reaction, including by condensation or addition, with or without pressure.

Additive deposition system 10 may be adapted to dispense one or more materials 20 via one or more dispenser heads 12. In some embodiments, a single dispenser head 12 may be adapted to dispense a plurality of distinct materials 20, either simultaneously or sequentially. In other embodiments, additive deposition system 10 may include a plurality of dispenser heads 12, which may be adapted to dispense a single material 20, either simultaneously or sequentially, or a plurality of materials 20, either simultaneously or sequentially.

Additive deposition system 10 may employ one or more materials 20 in an additive deposition process to form a thermal interface body. Material 20 may be a thermoplastic or thermosetting polymer, may be selected from a variety of polymers such as silicones, fluorosilicones, acrylics, thermoplastic elastomers, epoxies, polyesters, polyolefins, polyetheretherketones, polyamides, nylons, polyimides, polyurethanes, and combinations thereof. Silicone resins such as polysiloxane/polyorganosiloxane have properties of conformability and other characteristics useful in the thermal interface bodies of the present invention. In some embodiments, material 20 may be dispensed from dispenser head 12 in a curable condition in which the base polymer resin may be cross-linked or further cross-linked. The cross-linking activity may be initiated spontaneously or upon effective exposure to a curing agent. For the purposes hereof, a "curable resin precursor" includes a dispensable material that may undergo further polymerization, cross-linking, vulcanization, hardening, drying, or other chemical or physical change from its condition prior to dispensation. Such materials may be referred to as form-in-place, in which the dispensed material is cured subsequent to placement at a thermal pathway surface. It is contemplated that combinations of form-in-place materials and pre-cured materials may be employed by the present invention. In some embodiments, each of materials 20 contribute to a form-in-place composition and structure. It is to be understood that the term "resin" as used herein is intended to be inclusive of resins, oligomers, pre-polymers, elastomers, and other polymers.

The thermal interface bodies of the present invention are preferably thermally conductive, exhibiting a thermal conductivity of at least 0.2 W/m*K. Because the thermal conductivity of conformable polymers is relatively low, thermally conductive fillers may be added to the polymeric matrices. The thermally conductivity of filled thermal interface materials depends on various factors including thermal conductivity of the filler and the loading concentration of the filler in the polymeric matrix, which may be affected by filler particle size and distribution. The thermally conductive filler may include particles of uniform particle size, or with a distribution range of particle size. The thermally conductive particles may be electrically insulating to maintain an electrically-resistive characteristic to the thermal interface body. Example electrically-insulating, thermally-conductive particles suitable for use in the present invention include boron nitride, aluminum oxide, aluminum nitride, magnesium oxide, zinc oxide, silicon carbide, beryllium oxide, aluminum trihydrate, and combinations thereof. In some embodiments, the thermal interface body may preferably shield electromagnetic interference (EMI), and may therefore employ electrically and thermally-conductive particulate fillers. Example electrically-conductive particulate fillers include metals such as aluminum, copper, gold, nickel, silver, and combinations thereof. The shape of the thermally conductive filler particles is not specifically restricted and may include a single thermally conductive filler or a combination of two or more thermally conductive fillers that differ in at least one property such as particle shape, average particle size, particle size distribution, and type of filler. The particle type, size, size distribution, loading concentration, and blend may affect thermal transfer, EMI shielding, and viscosity characteristics.

Additional fillers and additives may be included in material 20 for particular chemical and/or physical property benefits, including plasticizers, pigments, surfactants, stabilizers, oxidants, flame retardants, and spacers.

Figure 2:
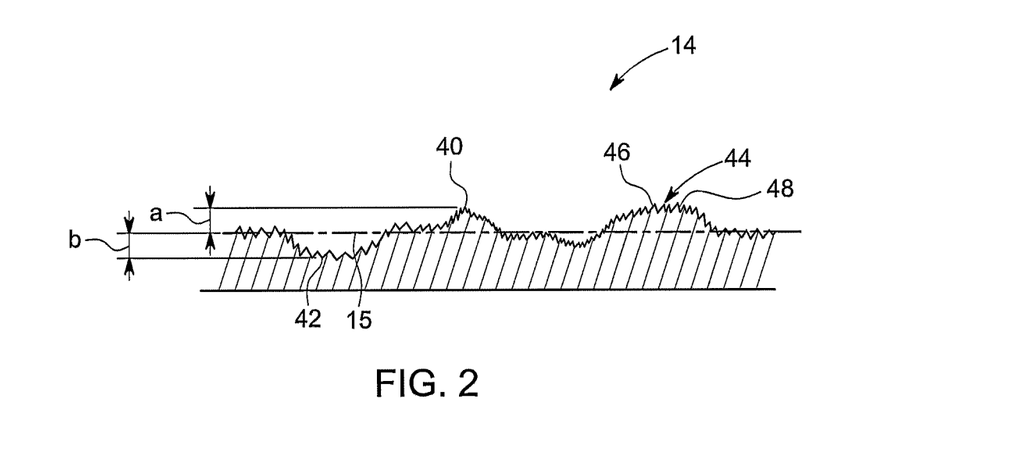
FIG. 2 is an enlarged cross-sectional view of a thermal surface of an electronic component or a heat dissipater.
Figure 3:
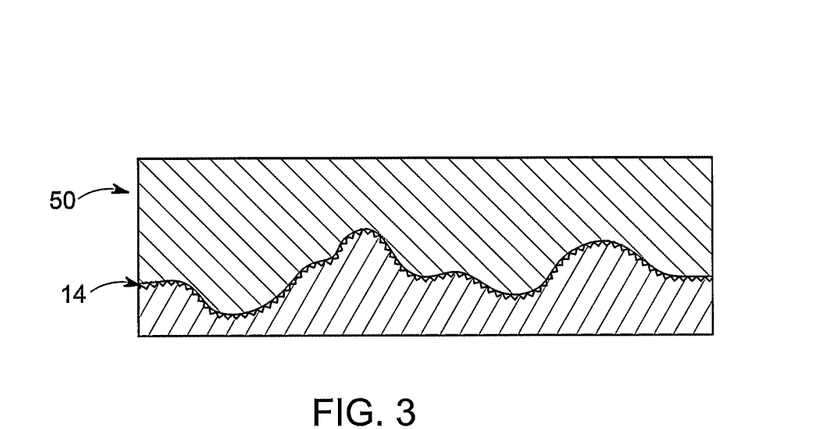
FIG. 3 is an enlarged cross-sectional view of a thermal interface body of the present invention with a conforming geometry to the thermal surface.

Applicant has determined that the component surfaces to which thermal interface bodies are applied may typically be somewhat non-planar, exhibiting peaks and valleys that may deviate from a base plane by 100 micrometers or more. Standard material roughness of the surface may present further deviations in the range of around 5-25 micrometers. FIG. 2 illustrates a hypothetical enlarged view of a surface 14 of, for example, an electronic component or a heat dissipater. A first deviation dimension "a" is defined between a base plane 15 of surface 14 and a primary peak 40, while a second deviation dimension "b" is defined between base plane 15 and a primary valley 42 of surface 14. Each of first and second deviation dimensions a, b may, in some embodiments, be up to 100 micrometers, and even greater in some cases. Additionally, a roughness 44 to surface 14 may include secondary peaks and valleys 46, 48. Surface roughness 44 may represent up to 25 micrometers or more deviation. In order to optimize heat transfer from surface 14 to a thermal interface body, it is desired to apply a thermal interface body that conforms as closely as possible to surface 14, including by conforming to its deviations. FIG. 3 schematically illustrates a desirable thermal interface body 50 in close conformity with surface 14. The present additively-constructed thermal interface body 50 may be formed into a three-dimensional geometry that permits enhanced conformability to uneven surfaces 14.

Figure 4:
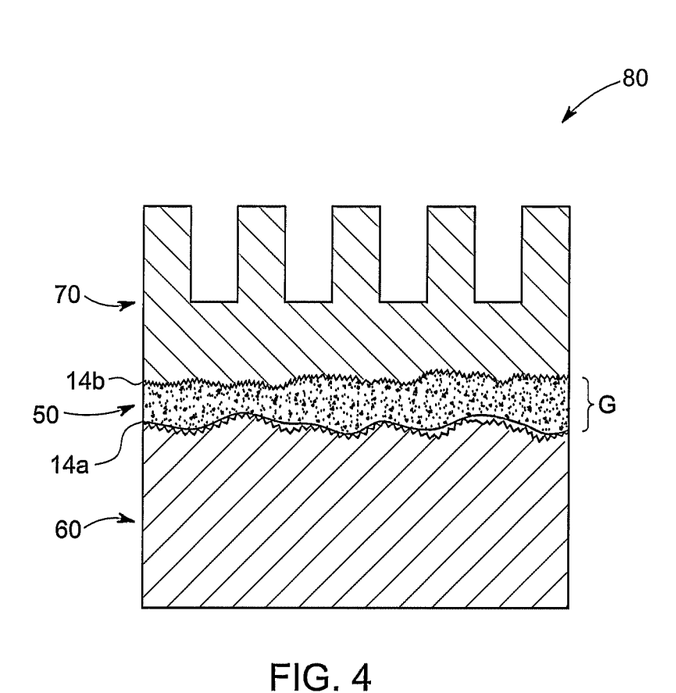
FIG. 4 is a cross-sectional view of an electronic package of the present invention.
Figure 5A:
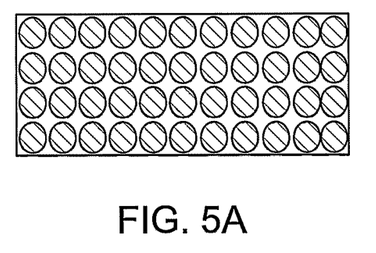
FIGS. 5A-5D in total illustrate an example additive deposition process.
Figure 5B:
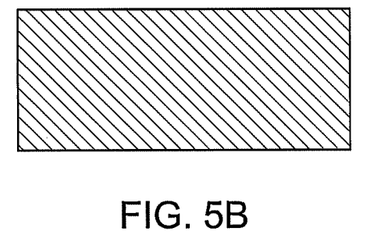
Figure 5C:
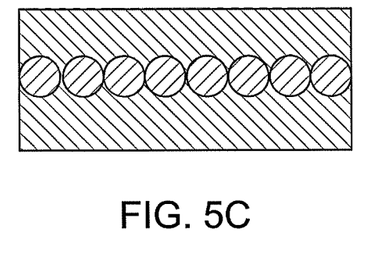
Figure 5D:
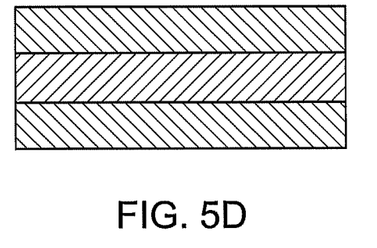
Figure 6A:
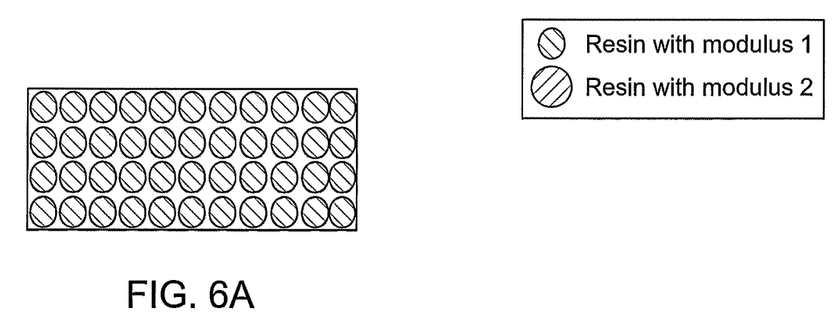
FIGS. 6A-6E in total illustrate an example additive deposition process.
Figure 6B:
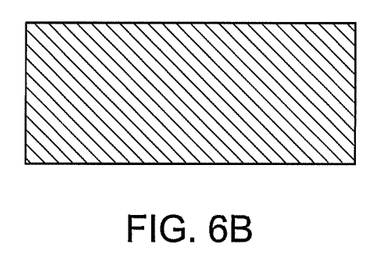
Figure 6C:
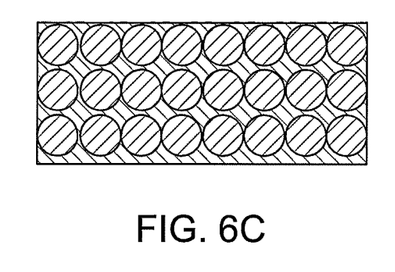
Figure 6D:
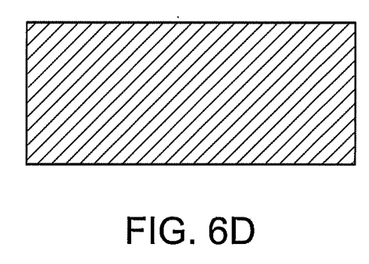
Figure 6E:
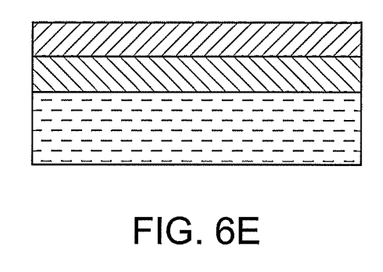
Figure 7A:
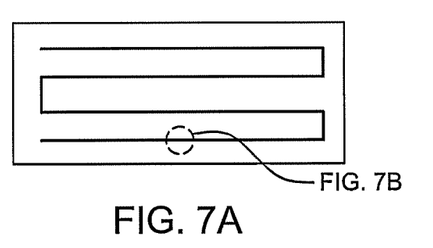
FIGS. 7A-7E in total illustrate an example additive deposition process.
Figure 7B:
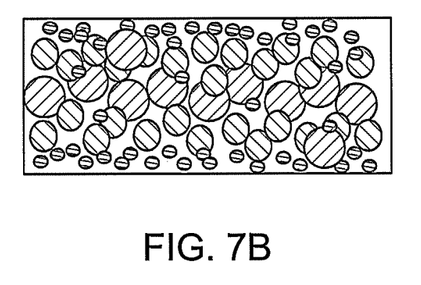
Figure 7C:
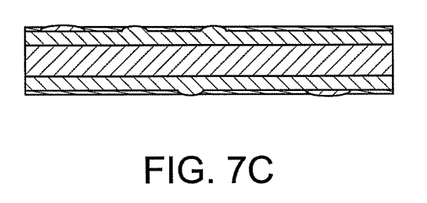
Figure 7D:
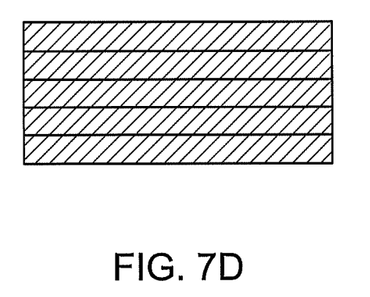
Figure 7E:
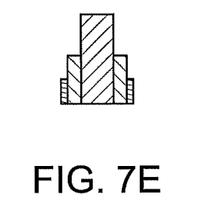
Figure 8A:
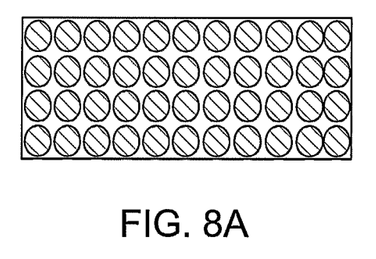
FIGS. 8A-8E in total illustrate an example additive deposition process.
Figure 8B:
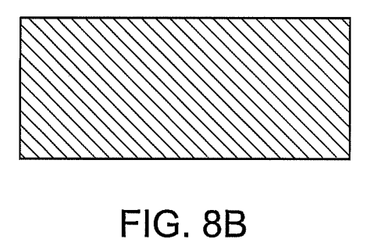
Figure 8C:
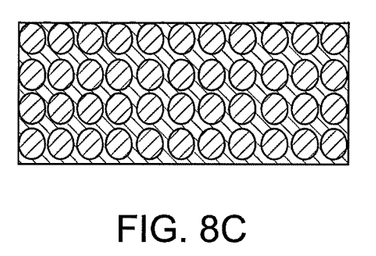
Figure 8D:
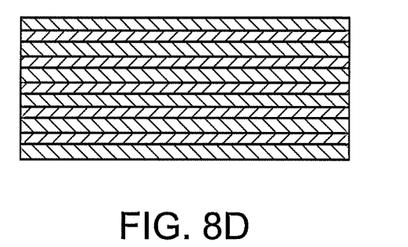
Figure 8E:
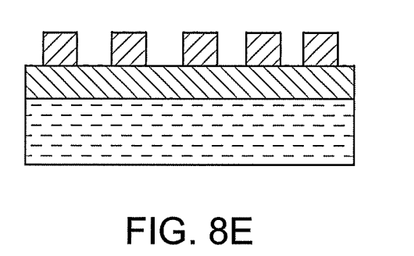
Figure 9A:
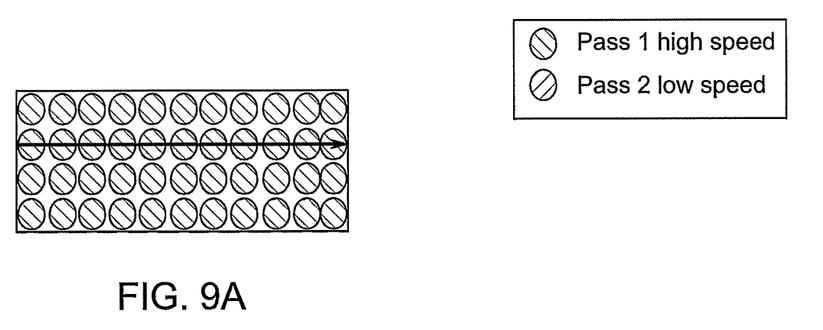
FIGS. 9A-9E in total illustrate an example additive deposition process.
Figure 9B:
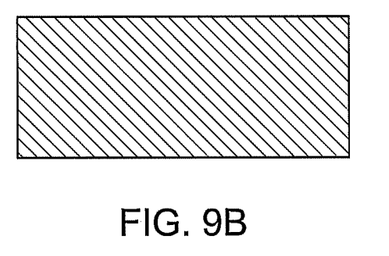
Figure 9C:
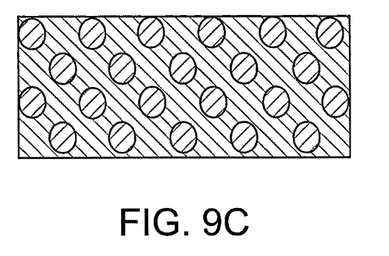
Figure 9D:
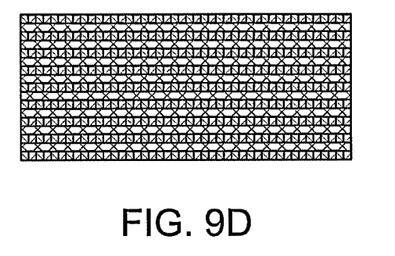
Figure 9E:
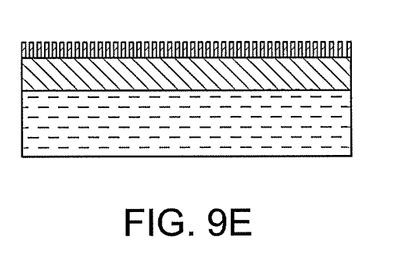
Figure 10A:
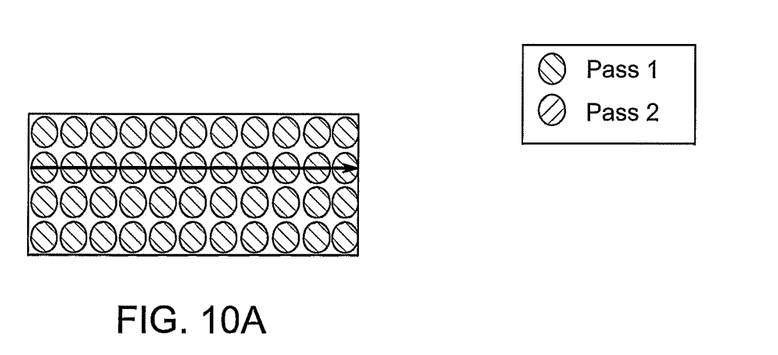
FIGS. 10A-10E in total illustrate an example additive deposition process.
Figure 10B:
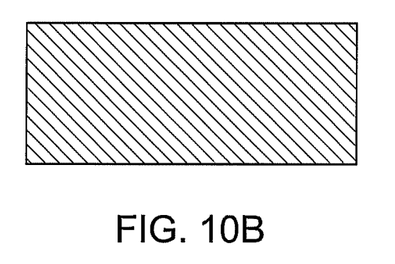
Figure 10C:
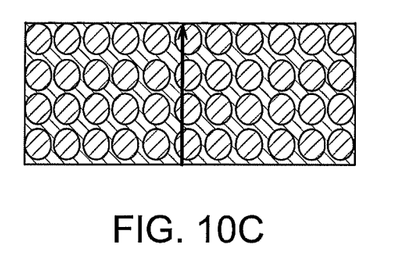
Figure 10D:
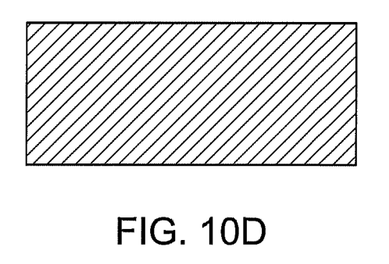
Figure 10E:
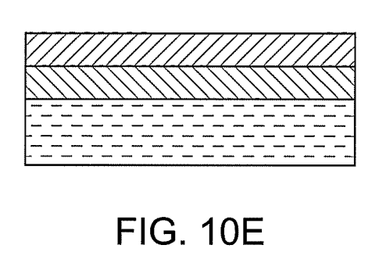

An example electronic package 80 is illustrated in FIG. 4 with a heat generating electronic component 60 having a first thermal surface 14a, and a heat dissipater 70 having a second thermal surface 14b. Thermal interface body 50 is interposed between and in thermal contact with first and second thermal surfaces 14a, 14b. Thermal interface body 50 may have an irregular geometry to best conform to the contoured and rough first and second thermal surfaces 14a, 14b. Thermal interface body 50 may exhibit an irregular geometry at operating temperatures of electronic component 60, as well as temperatures below such operating temperature, including at room temperature. In some embodiments, thermal interface body 50 may be formed in place with an irregular geometry that substantially fills a gap between electronic component 60 and heat dissipater 70. Such irregular geometry may be specifically fabricated through the additive deposition process of the present invention.

A gap "G" between electronic component 60 and heat dissipater 70 may be defined by various methods, including three-dimensional optical surface profiling. Information from such measurements, such as width and thickness dimensions, may be provided to controller 22 as an input parameter. Controller 22 may be programmed to interpret the input parameter for generating a control output directive for driving additive deposition system 10 in a manner to additively construct a thermal interface body 50 in the three-dimensional shape of gap "G".

The three-dimensional geometry of thermal interface body 50 may be customized by additively applying thermal interface material in a plurality of application passes. The thermal interface material applied in any given pass of one or more dispenser heads 12 may be identical, similar, or dissimilar in physical and/or chemical properties. The thermal interface material dispensed in each pass is preferably capable of bonding to thermal interface material dispensed in another pass so that a coherent thermal interface body 50 may ultimately be constructed through an additive deposition process. Dissimilarities among the thermal interface materials applied in different passes in an additive deposition process include average thermally conductive particle size, distribution of thermally conductive particle size, thermally conductive particle loading concentrations, cured viscosity, pre-cured viscosity, curing rate, thickness, and excess and limiting reactant compositions. Other chemical and physical dissimilarities among thermal interface material deposits for a given thermal interface body 50 are also contemplated by the present invention.

The customizable construction of thermal interface body 50 may also be controlled by dispensing specified volumes in a predetermined pattern, wherein at least a portion of a first pattern of a plurality of discrete volumes of thermal interface material may be in contact with at least a portion of a second pattern of deposited thermal interface material, which may be identical, similar, or dissimilar to the thermal interface material deposited in the first pattern of discrete volumes. In some embodiments, the thermal interface material 20 deposited may exhibit predetermined rheology parameters to best address flowability requirements in additively constructing thermal interface body 50.

EXAMPLES

The following examples represent specific additive deposition approaches to the construction of a customized geometry thermal interface body. It is contemplated, however, that many other additive deposition approaches may be utilized within the scope of the present invention.

Example 1

First and second curable resin precursors may have different pre-cured viscosities to control the cure and flow pattern. The lower viscosity resin precursor is able to wet out upon surface 14, while the higher viscosity resin assists in keeping the deposited thermal interface material in place prior to cure. FIG. 5 illustrates (through FIGS. 5A-5D in total) a multi-pass deposition approach with the first curable resin precursor applied onto a surface in a first pattern of a plurality of discrete volumes, with the deposited pattern of discrete volumes wetting out the surface to merge into a cohesive layer prior to application of the second curable resin precursor into contact with the first pattern. In some embodiments, the second pass may be performed by a second dispenser head and may alternatively dispense a cured material into contact with the first curable resin precursor. Further alternatively, at least a portion of the first curable resin precursor may be cured prior to the second pass applying the second material.

Example 2

First and second curable resin precursors may be applied in multiple passes of one or more dispenser heads, wherein the first and second curable resin precursors exhibit at least different cured Young's modulus values. FIG. 6 illustrates (through FIGS. 6A-6E in total) an example additive deposition process in which a first material is dispensed onto a surface in a first pattern of a plurality of discrete volumes, followed by an application of a second material in a second pattern of discrete volumes in contact with the first material. The first and second materials may be cured prior to or subsequent to deposition. The illustrated embodiment depicts curable resin precursors dispensed in curable condition and cured subsequent to deposition. The first material may be cured prior to, or subsequent to, the second pass additively depositing the second material into contact with the first material. In some embodiments, the first material exhibits a relatively low Young's modulus, while the second material exhibits a relatively high Young's modulus, with the first material forming a first compressible layer that is readily conformable to the heat transfer surface, while the second layer forms a durable shell over the first layer.

Example 3

First and second materials dispensed in respective patterns of a plurality of discrete volumes, wherein the first and second materials include different thermally conductive particle size distributions. A relatively large particle size distribution material may be applied in a first pattern of discrete volumes to better fill the primary valleys of the applicable surface. Filler packing optimization may be performed to meet thermal conductivity requirements.

Example 4

FIG. 7 illustrates (through FIGS. 7A-7E in total) an application of multiple thermal interface materials with different thermally conductive filler loading concentrations. In some embodiments, this approach may include first and second curable resin precursors applied in distinct patterns in an additive deposition process.

Example 5

First and second curable resin precursors may have different resin compositions for different physical properties such as adhesion, Young's modulus, and dispensation viscosity. FIG. 8 illustrates (through FIGS. 8A-8E in total) a first curable resin material deposited onto a surface in a first pattern of a plurality of discrete volumes, followed by the application of a second curable resin precursor in a second pattern of discrete volumes in contact with the first material. The first curable resin precursor may be cured prior to or subsequent to application of the second pattern into contact with the first material. Similarly, the second curable resin precursor may be applied into contact with the first material prior to or subsequent to curing. The illustrated embodiment exhibits a method in which the first and second curable resin precursors are cured subsequent to applying the second pattern of discrete volumes into contact with the first material.

Example 6

Thermal interface material may be applied in sequential patterns of a plurality of discrete volumes with one or more dispenser heads, wherein the dispensing parameters for and/or during each dispensing pass may be different. Possible variations include dispenser head speed, volumetric dispensing rate through a dispensing orifice of the dispenser head, and different material viscosities affecting deposition flow rate. FIG. 9 illustrates (through FIGS. 9A-9E in total) an example additive deposition process using different speeds of the one or more dispenser heads employed in the additive deposition process.

Example 7

Two dispenser heads may be used to dispense thermally conductive material substantially along mutually perpendicular planes. FIG. 10 illustrates (through FIGS. 10A-10E in total) the application of first and second patterns of a plurality of discrete volumes substantially along mutually perpendicular planes.

It is to be understood that various patterns may be employed to suit the particular application. For instance, a topography of a particular surface 14 may be studied through a known measurement process such as three-dimensional optical scanning so that an appropriate thermal interface body geometry may be mapped. The formation of the thermal interface body may require one or more passes of the dispenser head, including one or more layers of thermal interface material additively deposited into contact with one or more patterns of thermal interface material. It is to be further understood that distinct patterns or sets of patterns need not occupy a similar area, volume, or geometry. Instead, certain patterns of thermal interface material may be applied in select regions of the thermal interface body. It is also possible to cure only a portion of an applied pattern of thermal interface material prior to or subsequent to applying another pattern of thermal interface material.

The invention has been described herein in considerable detail to provide those skilled in the art with the information needed to apply the novel principles and to construct and use embodiments of the invention as required. However, it is to be understood that various modifications can be accomplished without departing from the scope of the invention itself.

What is claimed is:

1. A method for forming a thermal interface body, said method comprising:
   applying a first material including a first curable resin precursor onto a surface in a first pattern of a plurality of discrete volumes, wherein the first curable resin precursor includes silicone and exhibits a first initial viscosity and a thermal conductivity of at least 0.2 W/m*K; and
   applying at least one of the first curable resin precursor and a second material in a second pattern of discrete volumes in contact with the first material, wherein the second material exhibits a second viscosity that is different than the first viscosity and a thermal conductivity of at least 0.2 W/m*K,
   wherein the first curable resin precursor includes thermally conductive particles at a first loading concentration, and the second material includes thermally conductive particles at a second loading concentration, with the first loading concentration being different than the second loading concentration.

2. The method as in claim 1 wherein the applying is performed by an additive patternable dispenser.

3. The method as in claim 1 wherein the first curable resin precursor includes thermally conductive particles having a range of different particle diameters, with the largest particle diameter being at least 1.3 times greater than the smallest particle diameter.

4. The method as in claim 1, including applying at least the first or second patterns in spaced apart discrete volumes.

5. The method as in claim 4 wherein at least some of the discrete volumes merge together subsequent to applying.

6. The method as in claim 1 wherein the second material includes a silicone.

7. The method as in claim 1, including curing the first curable resin precursor to a cured viscosity that is greater than the first initial viscosity.

8. The method as in claim 7 wherein the first initial viscosity is less than 200,000 cP.

9. The method as in claim 8 including curing the second material to a second cured viscosity modulus that is greater than the second initial viscosity.

10. The method as in claim 9 wherein the second initial viscosity is less than 200,000 cP.

11. The method as in claim 1 wherein the first curable resin precursor includes a solvent, a reaction catalyst, and a reaction inhibitor effective to chemically interfere with the reaction catalyst, the reaction inhibitor having a lower vapor pressure than the solvent, and the second material including a second curable resin precursor.

12. The method as in claim 11 wherein the first and second curable resin precursors each include a vinyl containing silicone polymer and a hydride containing silicone polymer.

13. The method as in claim 12 wherein the first curable resin precursor includes an excess of one of the vinyl containing silicone polymer and the hydride containing silicone polymer, and the second curable resin precursor includes an excess of the other of the vinyl containing silicone polymer and the hydride containing silicone polymer.

14. The method as in claim 11, including removing at least 80% of the solvent in the first curable resin precursor in the first pattern prior to printing the second pattern.

15. The method as in claim 1 wherein the surface is a heat dissipating surface of an electronic component.

16. The method as in claim 15 wherein the electronic component is a pluggable optical module.

17. A method for forming a thermal interface body, said method comprising:
    dispensing a first curable resin precursor in a first pattern of a plurality of discrete volumes onto a surface;
    dispensing at least one of the first curable resin precursor and a second curable resin precursor in a second pattern of a plurality of discrete volumes onto at least one of the surface and the first pattern of discrete volumes;
    subsequent to dispensing, curing the first curable resin precursor to adjust its viscosity,
    wherein the thermal interface body exhibits a thermal conductivity of at least 0.2 W/m*K,
    wherein the first curable resin precursor includes thermally conductive particles at a first loading concentration, and the second material includes thermally conductive particles at a second loading concentration, with the first loading concentration being different than the second loading concentration.

18. The method as in claim 17, including, prior to curing by cross-linking, drying the first curable resin precursor to increase its viscosity to at least $10^6$ cP.

19. A method for filling a gap between an electronic component and a heat dissipater, said method comprising:
    providing a dispenser communicatively linked to a processor;
    defining an input parameter including one or more of a first width, second width, and thickness dimensions of the gap;
    supplying the input parameter to the processor; and
    additively applying with said dispenser, based on the input parameter;
    (i) a first layer of a first curable resin precursor onto a surface associated with at least one of the electronic component and the heat dissipater, the first layer having a thermal conductivity of at least 0.2 W/m*K; and
    (ii) a second layer of the first curable resin precursor or a second composition into contact with the first layer,
    wherein the first curable resin precursor includes thermally conductive particles at a first loading concentration, and the second composition includes thermally conductive particles at a second loading concentration, with the first loading concentration being different than the second loading concentration.

20. The method as in claim 19 wherein the first layer includes a first pattern of a plurality of discrete volumes of the first curable resin precursor.

21. The method as in claim 20 wherein the second layer includes a second pattern of a plurality of discrete volumes.

22. The method as in claim 21 wherein the second composition includes a second curable resin precursor having a thermal conductivity of at least 0.2 W/m*K.

23. The method as in claim 19 wherein the dispenser is an additive patternable dispenser.

24. The method as in claim 19, including additively building a thermal interface body from at least the first and second patterns to have the first width, second width, and thickness dimensions.

25. The method as in claim 24 wherein the thickness dimension is non-uniform.

26. The method as in claim 25 wherein the thickness dimension is less than 100 micrometers throughout the gap.

27. The method as in claim 24 wherein the thermal interface body has a thermal conductivity of at least 0.2 W/m*K.

28. The method as in claim 19 wherein each of the first and second layers include thermally conductive particles.

29. The method as in claim 28 wherein each of the first and second layers exhibits an initial, pre-cured viscosity and a cured viscosity that is greater than the pre-cured viscosity.

30. The method as in claim 29 wherein the second layer is different than the first layer by at least one of: thermally conductive particle loading concentrations, cured viscosity, initial pre-cured viscosity, average thermally conductive particle size, distribution of thermally conductive particle size, curing rate, and thickness dimensions.

31. The method as in claim 19, including defining the first width, second width, and thickness dimensions with optical surface profiling.

* * * * *